United States Patent [19]

Etzbach et al.

[11] Patent Number: 5,421,834
[45] Date of Patent: Jun. 6, 1995

[54] CYAN MIXTURES FOR DYE TRANSFER

[75] Inventors: Karl-Heinz Etzbach, Frankenthal; Thomas Werner; Ruediger Sens, both of Mannheim, all of Germany

[73] Assignee: BASF Aktiengesellschaft, Ludwigshafen, Germany

[21] Appl. No.: 58,228

[22] Filed: May 10, 1993

[30] Foreign Application Priority Data

May 12, 1992 [DE] Germany .............. 42 15 536.3

[51] Int. Cl.$^6$ .......................... C09B 67/22
[52] U.S. Cl. ............................ 8/643
[58] Field of Search .................... 8/643

[56] References Cited

U.S. PATENT DOCUMENTS

| | | |
|---|---|---|
| 4,940,692 | 7/1990 | Bach et al. . |
| 5,079,365 | 1/1992 | Sens et al. ............ 546/119 |
| 5,132,438 | 7/1992 | Bach et al. . |
| 5,147,845 | 9/1992 | Sens et al. ............ 503/227 |
| 5,208,210 | 5/1993 | Sens et al. ............ 503/227 |

FOREIGN PATENT DOCUMENTS

| | | |
|---|---|---|
| 0337200 | 10/1989 | European Pat. Off. . |
| 0351968 | 1/1990 | European Pat. Off. . |
| 0399473 | 11/1990 | European Pat. Off. . |
| 441282 | 8/1991 | European Pat. Off. . |
| 0479068 | 4/1992 | European Pat. Off. . |
| 480252 | 4/1992 | European Pat. Off. . |
| 0480278 | 4/1992 | European Pat. Off. . |
| 9200505 | 1/1992 | WIPO . |

OTHER PUBLICATIONS

Chemical Abstracts, JP A2 4288370, Oct. 13, 1992, (corr EP 0 480 252).

*Primary Examiner*—José G. Dees
*Assistant Examiner*—Samuel Barts
*Attorney, Agent, or Firm*—Oblon, Spivak, McClelland, Maier, & Neustadt

[57] ABSTRACT

Cyan thermal transfer dye mixtures comprise at least one anthraquinone dye whose absorption maximum is at a wavelength of from 600 to 750 nm and also at least one triazolopyridine, pyridone, 1-amidopyrid-2,6-dione, heterocyclic pyridone and/or halogenated quinolone dye.

3 Claims, No Drawings

CYAN MIXTURES FOR DYE TRANSFER

The present invention relates to novel dye mixtures comprising at least one anthraquinone dye whose absorption maximum is at a wavelength of from 600 to 750 nm and also at least one dye of the formula I, II, III, IV and/or V

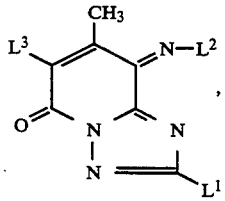
(I)

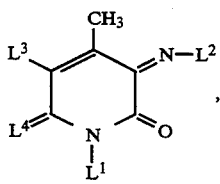
(II)

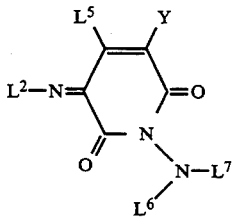
(III)

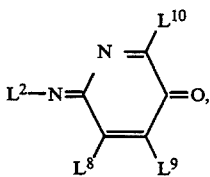
(IV)

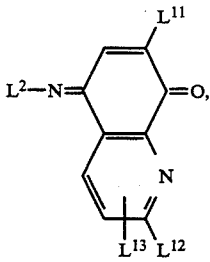
(V)

where $L^1$ is $C_1$–$C_{20}$-alkyl, which may be substituted and may be interrupted by from 1 to 4 oxygen atoms in ether function, substituted or unsubstituted phenyl or hydroxyl, $L^2$ is a 5- or 6-membered carbocyclic or heterocyclic radical, $L^3$ is cyano, carbamoyl, carboxyl or $C_1$–$C_4$-alkoxycarbonyl, $L^4$ is oxygen or a radical of the formula

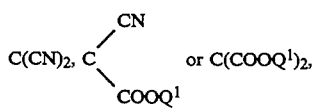

where $Q^1$ is in each case $C_1$–$C_8$-alkyl, which may be interrupted by 1 or 2 oxygen atoms in ether function, $L^5$ is hydrogen or $C_1$–$C_4$-alkyl, $L^6$ and $L^7$ are identical or different and each is independently of the other hydrogen, substituted or unsubstituted $C_1$–$C_{12}$-alkyl, $C_5$–$C_7$-cycloalkyl, substituted or unsubstituted phenyl, substituted or unsubstituted pyridyl, substituted or unsubstituted $C_1$–$C_{12}$-alkanoyl, $C_1$–$C_{12}$-alkoxycarbonyl, substituted or unsubstituted $C_1$–$C_{12}$-alkylsulfonyl, $C_5$–$C_7$-cycloalkylsulfonyl, substituted or unsubstituted phenylsulfonyl, substituted or unsubstituted pyridylsulfonyl, substituted or unsubstituted benzoyl, pyridylcarbonyl or thienylcarbonyl, or together with the nitrogen atom joining them together are unsubstituted or $C_1$–$C_4$-alkyl-substituted succinimido, unsubstituted or $C_1$–$C_4$-alkyl-substituted phthalimido or a five- or six-membered saturated heterocyclic radical, which may contain further hetero atoms, Y is cyano or a radical of the formula $CO-Q^2$, $CO-OQ^2$ or $CO-NHQ^2$, where $Q^2$ is hydrogen, $C_1$–$C_8$-alkyl, which may be substituted and may be interrupted by 1 or 2 oxygen atoms in ether function, $C_5$–$C_7$-cycloalkyl, phenyl or tolyl, $L^8$ is hydrogen, fluorine, chlorine, methyl or a radical of the formula $-NH-CO-A^1$, $-NH-CO-OA^1$, $-NH-CO-NA^1A^2$, $-NH-CS-OA^1$, $-NH-CS-NA^1A^2$, $-NH-CO-A^3$, $-NH-SO_2-A^1$, $-NH-SO_2-A^3$ or $-NH-SO_2-NA^1A^2$, where $A^1$ and $A^2$ are identical or different and each is independently of the other $C_1$–$C_8$-alkyl, which may be substituted and may be interrupted by 1 or 2 oxygen atoms in ether function, $C_5$–$C_7$-cycloalkyl, phenyl or tolyl, or else $-NA^1A^2$ is amino, and $A^3$ is a five- or six-membered aromatic heterocyclic radical, which may be benzofused and contain one or more hetero atoms selected from the group consisting of nitrogen, oxygen and sulfur, $L^9$ is hydrogen, fluorine or chlorine, or $L^8$ and $L^9$ together with the carbon atoms to which they are attached are a five- or six-membered aromatic carbocyclic or heterocyclic ring, $L^{10}$ is the abovementioned radical $A^3$ or a radical of the formula $-CO-OA^1$, $-CO-NH-A^1$, $-CO-NH-CO-A^1$, $-CO-NH-CO-A^3$, $-CO-NH-SO_2-A^3$, $-NH-CO-A^1$, $-NH-CO-OA^1$, $-NH-CO-NA^1A^2$, $-NH-CS-OA^1$, $-NH-CS-NA^1A^2$, $-NH-CO-A^3$, $-NH-SO_2-A^1$, $-NH-SO_2-A^3$ or $-NH-SO_2-NA^1A^2$, where $A^1$, $A^2$ and $A^3$ are each as defined above, $L^{11}$ is fluorine, chlorine or bromine, $L^{12}$ is hydrogen or $C_1$–$C_4$-alkyl, and $L^{13}$ is hydrogen, fluorine, chlorine or bromine, and also to a process for the thermal transfer thereof.

In the thermal transfer printing process, a transfer sheet, which contains a thermally transferable dye in one or more binders with or without suitable assistants on a substrate, is heated from the back with an energy source, for example a thermal head or a laser, in the form of short heating pulses (duration: fractions of a second), causing the dye to migrate out of the transfer sheet and diffuse into the surface coating of a receiving medium. The essential advantage of this process is that the amount of dye to be transferred, and hence the color gradation, is readily controlled by controlling the energy to be emitted by the energy source.

In general, color recording involves the use of the three subtractive primaries yellow, magenta and cyan (with or without black).

It is known to carry out the thermal transfer printing process with individual dyes or else with mixtures of dyes. However, it has been found that the dyes that are employed still have application defects.

It is an object of the present invention to provide novel dye mixtures in the cyan region that shall be advantageous for thermal transfer.

We have found that this object is achieved by the dye mixtures defined at the beginning.

One component of the novel dye mixtures comprises anthraquinone dyes whose absorption maximum is at a wavelength of from 600 to 750 nm, in particular at from to 680 nm.

Emphasis is here given to anthraquinone dyes of the formula VI, VII or VIII

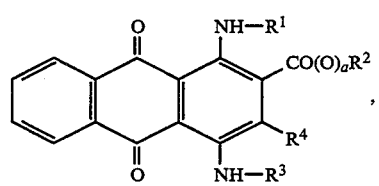
(VI)

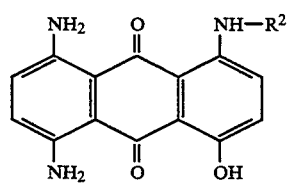
(VII)

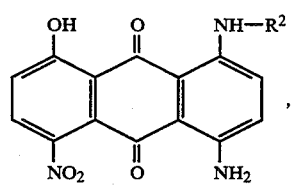
(VIII)

where
a is 0 or 1,
$R^1$, $R^2$ and $R^3$ are identical or different and each is independently of the others hydrogen, alkyl, alkoxyalkyl, alkanoyloxyalkyl, alkoxycarbonyloxyalkyl or alkoxycarbonylalkyl, each of which may have up to 20 carbon atoms and be phenyl-, $C_1$–$C_4$-alkylphenyl-, $C_1$–$C_4$-alkoxyphenyl-, halophenyl-, benzyloxy-, $C_1$–$C_4$-alkylbenzyloxy-, $C_1$–$C_4$-alkoxybenzyloxy-, halobenzyloxy-, halogen-, hydroxyl- or cyano-substituted, unsubstituted or $C_1$–$C_{15}$-alkyl-, alkoxy-, halogen- or benzyloxy-substituted phenyl, unsubstituted or $C_1$–$C_{15}$-alkyl-, $C_1$–$C_{15}$-alkoxy-, halogen- or benzyloxy-substituted cyclohexyl or a radical of the formula $[-E-O]_m-R^5$, where
E is $C_2$–$C_6$-alkylene,
m is 1, 2, 3, 4, 5 or 6, and
$R^5$ is $C_1$–$C_4$-alkyl or unsubstituted or $C_1$–$C_4$-alkyl-or $C_1$–$C_4$-alkoxy-substituted phenyl, and
$R^4$ is hydrogen or cyano,
with the proviso that $R^2$ is hydrogen only when a is 0.

$L^2$ can be derived for example from components of the benzene, indole, quinoline, aminonaphthalene, aminothiazole or aminothiophene series.

Emphasis is given to dye mixtures comprising at least one dye of the formula I, II, III, IV and/or V where $L^2$ is a radical of the formula

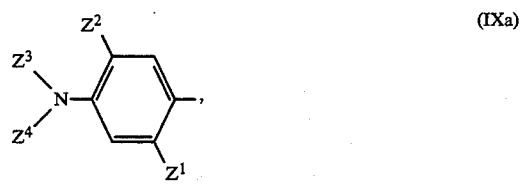
(IXa)

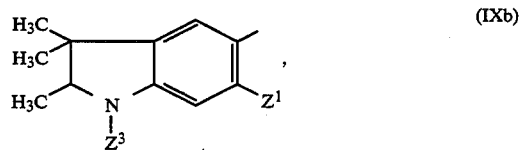
(IXb)

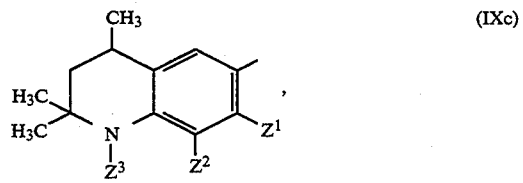
(IXc)

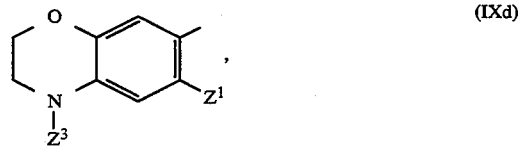
(IXd)

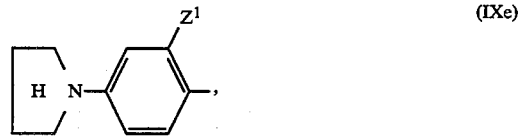
(IXe)

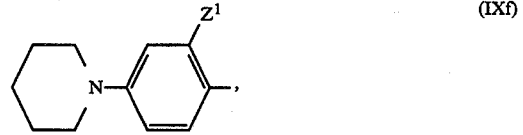
(IXf)

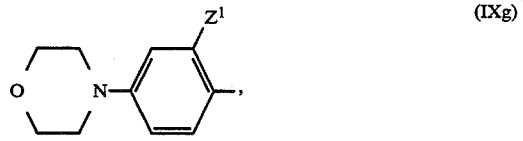
(IXg)

-continued

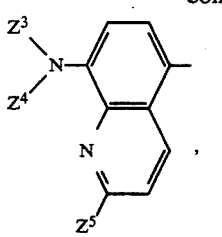 (IXh)

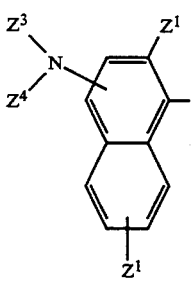 (IXi)

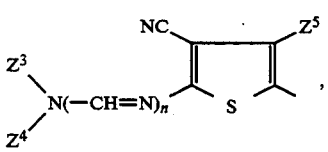 (IXj)

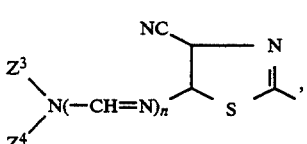 (IXk)

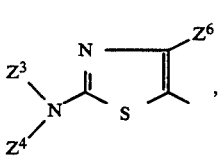 (IXl)

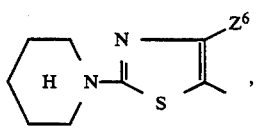 (IXm)

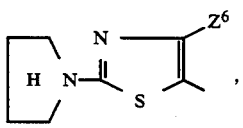 (IXn)

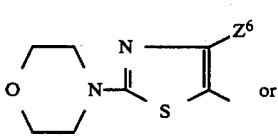 (IXo)

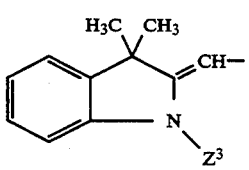 (IXp)

where
n is 0 or 1,
$Z^1$ is hydrogen, $C_1$–$C_8$-alkyl, which may be interrupted by 1 or 2 oxygen atoms in ether function, methoxy, ethoxy, $C_1$–$C_4$-alkylsulfonylamino, mono- or di($C_1$–$C_4$-alkyl) aminosulfonylamino, or the radical —NHCOZ$^7$ or —NHCO$_2$Z$^7$, where $Z^7$ is phenyl, benzyl, tolyl or $C_1$–$C_8$-alkyl, which may be interrupted by one or two oxygen atoms in ether function, $Z^2$ is hydrogen, methyl, methoxy or ethoxy, $Z^3$ and $Z^4$ are identical or different and each is independently of the other hydrogen, $C_1$–$C_8$-alkyl, which may be substituted and may be interrupted by one or two oxygen atoms in ether function, $C_3$–$C_4$-alkenyl, $C_5$–$C_7$-cycloalkyl, phenyl or tolyl, or together with the nitrogen atom joining them together are a five- or six-membered saturated heterocyclic radical, which may contain further hetero atoms, $Z^5$ is halogen or substituted or unsubstituted phenyl, and $Z^6$ is hydrogen, halogen, $C_1$–$C_8$-alkyl, substituted or unsubstituted phenyl, substituted or unsubstituted benzyl, cyclohexyl, thienyl, hydroxyl or mono($C_1$–$C_8$-alkyl) amino, and $L^5$ is as defined above.

Any alkyl, alkylene or alkenyl appearing in the abovementioned formulae can be not only straight-chain but also branched.

Any substituted alkyl appearing in the above-mentioned formulae may have as substituents for example, unless otherwise stated, cyano, phenyl, tolyl, $C_1$–$C_6$-alkanoyloxy, $C_1$–$C_4$-alkoxycarbonyl, $C_1$–$C_4$-alkylaminocarbonyloxy or a $C_1$–$C_4$-alkoxycarbonyloxy in which the alkoxy group may be substituted by phenyl or $C_1$–$C_4$-alkoxy, Any substituted phenyl or pyridyl appearing in the abovementioned formulae may have as substituents for example halogen, $C_1$–$C_4$-alkyl or $C_1$–$C_4$-alkoxy.

E is for example ethylene, 1,2- or 1,3-propylene, 1,2-, 1,3-, 1,4- or 2,3-butylene, pentamethylene, hexamethylene or 2-methylpentamethylene.

$R^1$, $R^2$, $R^3$, $R^5$, $Z^1$, $L^1$, $L^5$, $L^6$, $L^7$, $L^{12}$, $A^1$, $A^2$, $Q^1$, $Q^2$, $Z^1$, $Z^3$, $Z^4$, $Z^6$ and $Z^7$ are each for example methyl, ethyl, propyl, isopropyl, butyl, isobutyl, sec-butyl or tert-butyl.

$R^1$, $R^2$, $R^3$, $L^1$, $L^6$, $L^7$, $A^1$, $A^2$, $Q^1$, $Q^2$, $Z^1$, $Z^3$, $Z^4$, $Z^6$ and $Z^7$ may each also be for example pentyl, isopentyl, neopentyl, tert-pentyl, hexyl, 2-methylpentyl, heptyl, octyl, 2-ethylhexyl or isooctyl.

$R^1$, $R^2$, $R^3$, $L^1$, $L^6$ and $L^7$ may each also be for example nonyl, isononyl, decyl, isodecyl, undecyl or dodecyl.

$R^1$, $R^2$, $R^3$ and $L^1$ may each also be for example tridecyl, isotridecyl, tetradecyl, pentadecyl, hexadecyl, heptadecyl, octadecyl, nonadecyl or eicosyl. (The designations isooctyl, isononyl, isodecyl and isotridecyl are trivial names derived from the alcohols obtained by the oxo process (cf. Ullmanns Enzyklopädie der technischen Chemie, 4th edition, volume 7, pages 215 to 217, and volume 11, pages 435 and 436).).

$R^1$, $R^2$, $R^3$, $A^1$, $A^2$, $Q^2$, $L^1$, $Z^1$ and $Z^7$ may each also be for example 2-methoxyethyl, 2-ethoxyethyl, 2-propoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl or 2- or 4-butoxybutyl.

$L^1$, $R^1$, $R^2$, $R^3$, $A^1$, $A^2$, $Q^2$, and $Z^1$ may each also be for example 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl or 4,8-dioxadecyl.

$R^1$, $R^2$, $R^3$ and $L^1$ may each also be for example 3,6,9-trioxadecyl, 3,6,9-trioxaundecyl, 3,6,9,12-tetraoxatridecyl, 3,6,9,12-tetraoxatetradecyl, 2-methoxycarbonylethyl, benzyl, 1- or 2-phenylethyl, 3-benzyloxypropyl or 2-, 3- or 4-chlorophenyl.

$L^3$ may be for example methoxycarbonyl, ethoxycarbonyl, propoxycarbonyl, isopropoxycarbonyl, butoxycarbonyl, isobutoxycarbonyl, or sec-butoxycarbonyl $R^1$, $R^2$, $R^3$, $L^1$ and $Z^6$ may each also be for example 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl or 2,4-dimethoxyphenyl.

$L^6$ and $L^7$ may each also be for example phenyl, 2-, 3- or 4-methylphenyl, 2-, 3- or 4-methoxyphenyl, pyridyl, 2-, 3- or 4-methylpyridyl, 2-, 3- or 4-methoxypyridyl, formyl, acetyl, propionyl, butyryl, isobutyryl, pentanoyl, hexanoyl, heptanoyl, octanoyl, 2-ethylhexanoyl, methoxycarbonyl, ethoxycarbonyl, propoxycarbonyl, isopropoxycarbonyl, butoxycarbonyl, methylsulfonyl, ethylsulfonyl, propylsulfonyl, isopropylsulfonyl, butylsulfonyl, cyclopentylsulfonyl, cyclohexylsulfonyl, cycloheptylsulfonyl, phenylsulfonyl, tolylsulfonyl, pyridylsulfonyl, benzoyl, 2-, 3- or 4-methylbenzoyl, 2-, 3- or 4-methoxybenzoyl, thien-2-ylcarbonyl or thien-3-ylcarbonyl.

$R^1$, $R^2$, $R^3$, $Q^2$, $L^6$, $Z^3$ and $Z^4$ may each also be for example 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbonylpropyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl or 2- or 3-(2-ethoxyethoxycarbonyloxy)propyl.

$Q^2$, $L^6$, $L^7$, $Z^3$ and $Z^4$ may each also be for example benzyl, 2-methylbenzyl, 1- or 2-phenylethyl, cyclopentyl, cyclohexyl, cycloheptyl or 2-, 3- or 4-methylphenyl.

$Z^1$ is for example methylsulfonylamino, ethylsulfonylamino, propylsulfonylamino, isopropylsulfonylamino, butylsulfonylamino, mono- or dimethylaminosulfonylamino, mono- or diethylaminosulfonylamino, mono- or dipropylaminosulfonylamino, mono- or diisopropylaminosulfonylamino, mono- or dibutylaminosulfonylamino or (N-methyl-N-ethylaminosulfonyl)amino.

$Z^6$ may also be for example, like $Z^{50}$ fluorine chlorine or bromine.

$Z^6$ may also be for example phenyl, 2-methylphenyl, 2,4-dimethylphenyl, 2-methoxyphenyl, 2,4-dimethoxyphenyl, benzyl, 2-methylbenzyl, 2,4-dimethylbenzyl, 2-methoxybenzyl, 2,4-dimethoxybenzyl, methylamino, ethylamino, propylamino, isopropylamino, butylamino, pentylamino, hexylamino, heptylamino, octylamino or 2-ethylhexylamino.

$Z^3$ and $Z^4$ may each also be for example allyl or methallyl.

$L^6$ combined with $L^7$ or $Z^3$ with $Z^4$ to form together with the nitrogen atom joining them together a five- or six-membered saturated heterocyclic radical, which may have further hetero atoms, can be for example pyrrolidinyl, piperidinyl, morpholinyl, piperazinyl or N-($C_1$-$C_4$-alkyl)piperazinyl.

$L^6$, $L^7$, $A^1$ and $A^2$ may each also be for example cyclopentyl, cyclohexyl or cycloheptyl.

$A^3$ is derived from a five- or six-membered aromatic heterocyclic radical which may be benzofused and have one or more hetero atoms selected from the group consisting of nitrogen, oxygen and sulfur.

Examples of suitable heterocyclic structures with or without substituents from which $A^3$ can be derived are pyrrole, furan, thiophene, pyrazole, imidazole, oxazole, isoxazole, thiazole, isothiazole, 1,2,4-triazole, 1,2,4-oxadiazole, 1,3,4-oxadiazole, 1,2,4-thiadiazole, 1,3,4-thiadiazole, pyridine, pyridazine, pyrimidine or pyrazine.

Emphasis is here given to heterocycles of the pyrrole, thiophene, isoxazole, pyridine or pyridazine series.

Suitable $A^3$—CO or $A^3$—$SO_2$ radicals are in particular those five- or six-membered aromatic heterocyclic radicals derived from the following heterocyclic carboxylic acids $A^3$—COOH or sulfonic acids $A^3$—$SO_3H$:

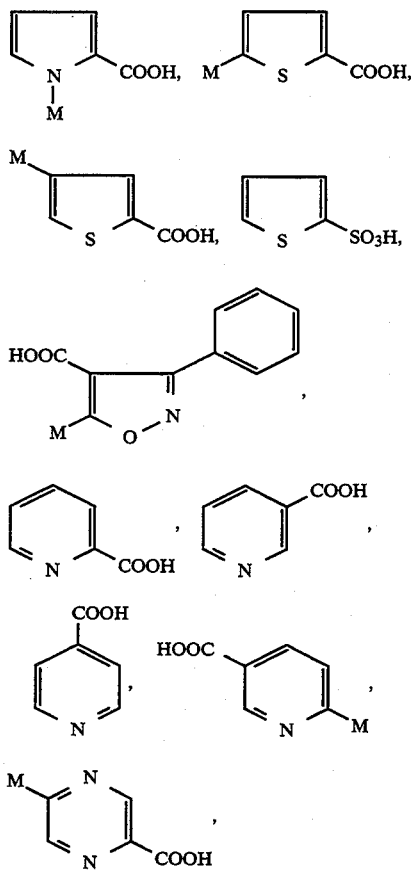

where
M is in each case $C_1$-$C_4$-alkyl.

Preferred mixture components are dyes of the formula I or II where $L^3$ is cyano.

Preferred mixture components further include dyes of the formula I or II where $L^2$ is derived from a component of the benzene, indole, quinoline, aminonaphthalene, aminothiazole or aminothiophene series.

Preferred mixture components further include dyes of the formula I or II where $L^1$ is $C_1$-$C_{12}$-alkyl, which may be substituted by $C_1$–$C_6$-alkanoyloxy, by $C_1$–$C_8$-alkoxycarbonyl, whose alkyl chain may be interrupted by 1 or 2 oxygen atoms in ether function, by phenyl or by $C_1$–$C_4$-alkylphenyl and may be interrupted by 1 or 2 oxygen atoms in ether function.

Particularly preferred mixture components are dyes of the formula I or II where $L^1$ is alkyl, alkoxyalkyl, alkanoyloxyalkyl or alkoxycarbonyloxyalkyl, which may each have up to 12 carbon atoms, unsubstituted or methyl-substituted benzyl or unsubstituted or methyl-substituted phenyl.

Particularly preferred mixture components further include dyes of the formula I or II where $L^2$ is a radical of the abovementioned formula IXa, IXc, IXl, IXm, IXn or IXo.

Preference for use as mixture components is given to dyes of the formula III where $L^2$ is a radical of the formula IXa, IXc, IXl, IXm, IXn or IXo, or IXp, of which a radical IXc or IXl is particularly suitable.

Particular emphasis for use as mixture components is given to dyes of the formula IIIa

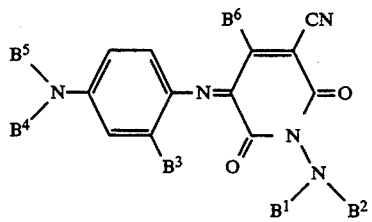

(IIIa)

where $B^1$ and $B^2$ are each independently of the other hydrogen, $C_1$–$C_8$-alkyl, phenyl, tolyl, $C_1$–$C_8$-alkylcarbonyl, $C_1$–$C_8$-alkylsulfonyl, phenylsulfonyl, tolylsulfonyl, pyridylsulfonyl, benzoyl, methylbenzoyl, pyridylcarbonyl or thienylcarbonyl, $B^3$ is hydrogen, methyl, methoxy or the radical —NHCOZ$^7$ or —NHCO$_2$Z$^7$ where Z$^7$ is phenyl, benzyl, tolyl or C–C$^8$-alkyl, which may be interrupted by one or two oxygen atoms in ether function, $B^4$ and $B^5$ are each independently of the other hydrogen, $C_1$–$C_8$-alkyl, 2-cyanoethyl, benzyl, $C_1$–$C_4$-alkanoyloxy-$C_2$–$C_4$-alkyl, $C_1$–$C_4$-alkoxycarbonyl-$C_1$–$C_4$-alkyl or $C_1$–$C_4$-alkoxycarbonyloxy-$C_2$–$C_4$-alkyl and $B^6$ is hydrogen or methyl.

Particular emphasis for use as mixture components is also given to dyes of the formula IIIb

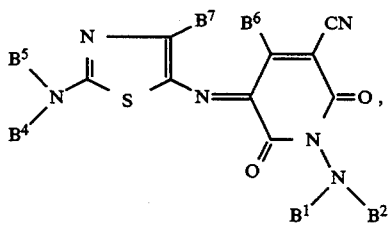

(IIIb)

where $B^7$ is $C_1$–$C_6$-alkyl, phenyl, tolyl, anisidyl, benzyl, cyclohexyl or thienyl and $B^1$, $B^2$, $B^4$, $B^5$ and $B^6$ are each as defined under the formula IIIa.

Very particular emphasis is given to dyes of the formula IIIa where $B^1$ and $B^2$ are each independently of the other $C_1$–$C_8$-alkylcarbonyl, benzoyl, methylbenzoyl or thienylcarbonyl.

Preference for use as mixture components is further given to dyes of the formula IV where $L^8$ is hydrogen, chlorine or methyl and $L^9$ is hydrogen or chlorine.

Particular preference for use as mixture components is further given to pyridone dyes of the formula IV where $L^2$ is a radical of the formula IXa, IXc, IXe, IXf, IXg, IXj, IXl, IXm, IXn or IXo, particular emphasis being given to a radical of the formula IXa or IXc.

Particularly suitable mixture components are pyridone dyes of the formula IVa

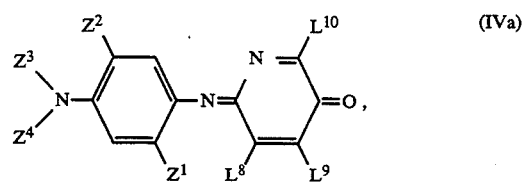

(IVa)

where $L^8$ is hydrogen, chlorine or methyl, $L^9$ is hydrogen or chlorine, $L^{10}$ is a radical of the formula —CO—NH—A$^1$, —NH—CO—A$^1$, —NH—CO—OA$^1$ or —NH—CO—NA$^1$A$^2$, where A$^1$ and A$^2$ are each independently of the other $C_1$–$C_8$-alkyl, 2-cyanoethyl, benzyl, $C_1$–$C_4$-alkanoyloxy-$C_2$–$C_4$-alkyl, $C_1$–$C_4$-alkoxycarbonyl-$C_1$–$C_4$-alkyl, $C_1$–$C_4$-alkoxycarbonyloxy-$C_2$–$C_4$-alkyl, $C_5$–$C_7$-cycloalkyl, phenyl or tolyl, or else —NA$^1$A$^2$ is amino, $Z^1$ is hydrogen, methyl, methoxy or the radical —NHCOZ$^7$ or —NHCO$_2$Z$^7$, where Z$^7$ is phenyl, benzyl, tolyl or $C_1$–$C_8$-alkyl, which may be interrupted by 1 oxygen atom in ether function, $Z^2$ is hydrogen, and $Z^3$ and $Z^4$ are each independently of the other hydrogen, $C_1$–$C_8$-alkyl, 2-cyanoethyl, benzyl, $C_1$–$C_4$-alkanoyloxy-$C_2$–$C_4$-alkyl, $C_1$–$C_4$-alkoxycarbonyl-$C_1$–$C_4$-alkyl or $C_1$–$C_4$-alkoxycarbonyloxy-$C_2$–$C_4$-alkyl.

Particularly suitable mixture components also include pyridone dyes of the formula IVb

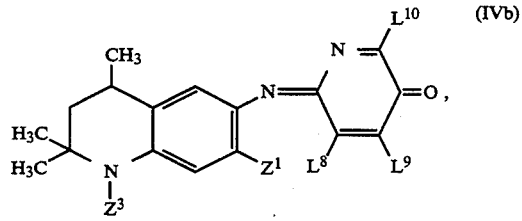

(IVb)

where $L^8$ is hydrogen, chlorine or methyl, $L^9$ is hydrogen or chlorine, $L^{10}$ is a radical of the formula —CO—NH—A$^1$, —NH—CO—A$^1$, —NH—CO—OA$^1$ or —NH—CO—NA$^1$A$^2$, where A$^1$ and A$^2$ are each independently of the other $C_1$–$C_8$-alkyl, 2-cyanoethyl, benzyl, $C_1$–$C_4$-alkanoyloxy-$C_2$–$C_4$-alkyl, $C_1$–$C_4$-alkoxycarbonyl-$C_1$–$C_4$-alkyl, $C_1$–$C_4$-alkoxycarbonyloxy-$C_2$–$C_4$-alkyl, $C_5$–$C_7$-cycloalkyl, phenyl or tolyl, or else —NA$^1$A$^2$ is amino, $Z^1$ is hydrogen, methyl, methoxy or the radical —NHCOZ$^7$ or —NHCO$_2Z^7$ where $Z^7$ is phenyl, benzyl, tolyl or $C_1$-$C_8$-alkyl, which may be interrupted by 1 oxygen atom in ether function, $Z^3$ is hydrogen, $C_1$-$C_8$-alkyl, 2-cyanoethyl, benzyl, $C_1$-$C_4$-alkanoyloxy-$C_2$-$C_4$-alkyl, $C_1$-$C_4$-alkoxycarbonyl-$C_1$-$C_4$-alkyl or $C_1$-$C_4$-alkoxycarbonyloxy-$C_2$-$C_4$-alkyl.

Very particular emphasis for use as mixture components is given to pyridone dyes of the formula IVa or IVb where $L^{10}$ is the radical —NH—COA$^1$, where $A^1$ is $C_1$-$C_8$-alkyl, which may be interrupted by 1 oxygen atom in ether function, and $Z^1$ is the radical —NH—COZ$^7$ or —NHCO$_2Z^7$, where $Z^7$ is phenyl, benzyl, tolyl or $C_1$-$C_8$-alkyl, which may be interrupted by 1 oxygen atom in ether function.

Preference for use as mixture components is further given to dyes of the formula V where
$L^{11}$ is chlorine
$L^{12}$ is hydrogen or methyl,
$L^{13}$ is hydrogen, and
$L^2$ is a radical of the formula IXa, IXc, IXe, IXf or IXg, emphasis being given to those dyes in which $Z^1$ is hydrogen or the radical —NH—COZ$^7$ or —NHCO$_2Z^7$, where $Z^7$ is in each case as defined above.

Particular preference for use as mixture components is given to dyes of the formula V where
$L^{11}$ is chlorine,
$L^{12}$ is hydrogen or methyl,
$L^{13}$ is hydrogen, and
$L^2$ is a radical of the formula IXa or IXc where
$Z^1$ is hydrogen, methyl or acetylamino,
$Z^2$ is hydrogen or methoxy, and
$Z^3$ are each independently of the other hydrogen, benzyl or substituted or unsubstituted $C_1$-$C_8$-alkyl.

Preferred mixture components also include anthraquinone dyes of the formula VI, VII and/or VIII where $R^1$, $R^2$ and $R^3$ are each independently of the others alkyl or alkoxyalkyl, which may each have up to 15 carbon atoms and can be substituted by phenyl, $C_1$-$C_4$-alkyl or $C_1$-$C_4$-alkoxyphenyl and interrupted by 1 or 2 oxygen atoms in ether function.

Emphasis for use as mixture components is also given to anthraquinone dyes of the formula VIa

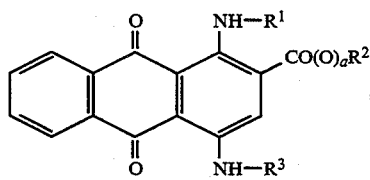

(VIa)

where
a is 0 or 1,
$R^1$ is $C_1$-$C_{15}$-alkyl,
$R^2$ is $C_1$-$C_{15}$-alkyl, a radical of the formula $[-E^1-O]_p-R^7$, where
$E^1$ is $C_2$-$C_4$-alkylene,
p is 1, 2, 3 or 4, and
$R^7$ is $C_1$-$C_4$-alkyl or phenyl, or else, when a is 0, hydrogen, and
$R^3$ is $C_1$-$C_{15}$-alkyl or unsubstituted or $C_1$-$C_{15}$-alkyl- or $C_1$-$C_{15}$-alkoxy-substituted phenyl.

Particularly preferred mixture components also include anthraquinone dyes of the formula VIb

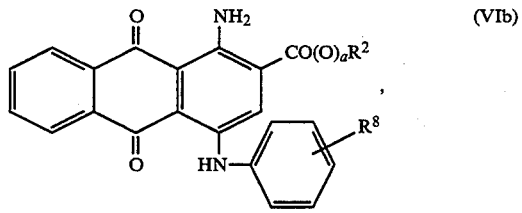

(VIb)

where
a is 0 or 1,
$R^2$ is $C_1$-$C_{15}$-alkyl, a radical of the formula $[-E^1-O]_p-R^7$, where
$E^1$ is $C_2$-$C_4$-alkylene,
p is 1, 2, 3 or 4, and
$R^7$ is $C_1$-$C_4$-alkyl or phenyl, or else, when a is 0, hydrogen, and
$R^8$ is $C_1$-$C_{15}$-alkyl or $C_1$-$C_{15}$-alkoxy.

Particularly preferred mixture components also include anthraquinone dyes of the formula IVc

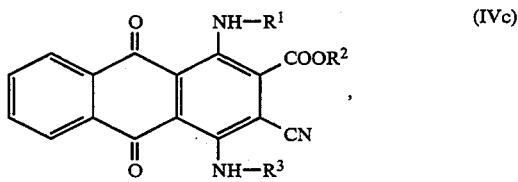

(IVc)

where
$R^2$ is $C_1$-$C_{15}$-alkyl or a radical of the formula $[-E^1-O]_p-R^7$, where
$E^1R^7$ and p are each as defined above, and
$R^1$ and $R^3$ are each independently of the other hydrogen or unsubstituted or $C_1$-$C_{15}$-alkyl- or $C_1$-$C_{15}$-alkoxy-substituted benzyl or phenyl, $C_4$-$C_{15}$-alkanoyloxyalkyl, $C_4$-$C_{15}$-alkoxycarbonyloxyalkyl, $C_4$-$C_{15}$-alkoxycarbonylalkyl or the radical $R_2$.

Emphasis is given to dye mixtures comprising an anthraquinone dye of the formula VI and a dye of the formula I.

Emphasis is further given to dye mixtures comprising an anthraquinone dye of the formula VI and a dye of the formula II.

Emphasis as further given to dye mixtures comprising an anthraquinone dye of the formula VI and a dye of the formula III.

Emphasis as further given to dye mixtures comprising an anthraquinone dye of the formula VI and a dye of the formula IV.

Emphasis as further given to dye mixtures comprising an anthraquinone dye of the formula VI and a dye of the formula V.

Emphasis as further given to dye mixtures comprising an anthraquinone dye of the formula VII and a dye of the formula I.

Emphasis as further given to dye mixtures comprising an anthraquinone dye of the formula VII and a dye of the formula II.

Emphasis is further given to dye mixtures comprising an anthraquinone dye of the formula VII and a dye of the formula III.

Emphasis is further given to dye mixtures comprising an anthraquinone dye of the formula VII and a dye of the formula IV.

Emphasis is further given to dye mixtures comprising an anthraquinone dye of the formula VII and a dye of the formula V.

Emphasis is further given to dye mixtures comprising an anthraquinone dye of the formula VIII and a dye of the formula I.

Emphasis is further given to dye mixtures comprising an anthraquinone dye of the formula VIII and a dye of the formula II.

Emphasis is further given to dye mixtures comprising an anthraquinone dye of the formula VIII and a dye of the formula III.

Emphasis is further given to dye mixtures comprising an anthraquinone dye of the formula VIII and a dye of the formula IV.

Emphasis is further given to dye mixtures comprising an anthraquinone dye of the formula VIII and a dye of the formula V.

Of particular suitability are dye mixtures comprising an anthraquinone dye of the formula VI or VII, of which those dye mixtures comprising an anthraquinone dye of the formula VI are particularly important.

Also of particular suitability are dye mixtures comprising a dye of the formula I.

Of very particular importance are those dye mixtures that comprise an anthraquinone dye of the formula VI and a dye of the formula I.

The dye mixtures of the invention generally contain from 10 to 90% by weight, preferably from 40 to 80% by weight, in particular from 70 to 80% by weight, each percentage being based on the weight of the dye mixture, of one or more anthraquinone dyes and also from 10 to 90% by weight, preferably from 20 to 60% by weight, in particular from 20 to 30% by weight, each percentage being based on the weight of the dye mixture, of one or more dyes of the formula I, II, III, IV and/or V.

The novel dye mixtures can be obtained in a conventional manner, for example by mixing the individual dyes in the abovementioned weight ratio.

The anthraquinone dyes are known per se and described for example in EP-A-337 200, EP-A-351 968 and EP-A-480 278 or can be obtained by the methods mentioned therein.

The dyes of the formula I, II, III, IV and V are likewise known and described for example in U.S. Pat. No. 5,079,365, earlier Patent Application PCT/EP/92/00505 also in EP-A-480 252 and EP-A-479 068.

The cyan dye mixtures of the invention are notable for advantageous application properties. They show high solubility in the color ribbon (high compatibility with the binder), high stability in the printing ink, good transferability, high image stability (ie. good light fastness and also good stability to ambient influences, for example humidity, temperature or chemicals) and permit flexible coloristic adaptation to given subtractive primary inks in yellow and magenta to achieve an optimal trichromatic system (maximum brilliance of primary or mixed colors and a deep neutral black).

Of particular noteworthiness is the spectrally uniform decay rate of the individual components on irradiation, ie. the dye which has the inferior light-fastness as an individual dye does not decay preferentially.

The present invention also provides a process for transferring dyes from a transfer to plastic-coated paper by diffusion or sublimation by means of an energy source, which comprises using a transfer on which there is a dye mixture as defined at the beginning.

The dye transfers required for the process of the invention are prepared as follows. The dye mixtures are incorporated in a suitable organic solvent or in mixtures of solvents with one or more binders and with or without assistants to form a printing ink. It preferably contains the dye mixture in a molecularly dispersed, ie. dissolved, form. The printing ink can then be knife coated onto an inert substrate and air dried. Suitable organic solvents for the dye mixtures are for example those in which the solubility of the dye mixtures at 20° C. is greater than 1% by weight, preferably greater than 5% by weight.

Examples are ethanol, propanol, isobutanol, tetrahydrofuran, methylene chloride, methyl ethyl ketone, cyclopentanone, cyclohexanone, toluene, chlorobenzene and mixtures thereof.

As binders it is possible to use any resin or polymer material that is soluble in organic solvents and capable of binding the dye mixture to the inert substrate in such a way that it will not rub off. Preference is here given to those binders which, after the air drying of the printing ink, hold the dye mixture in the form of a clear, transparent film in which no visible crystallization of the dye mixture will occur.

Binders of this type are mentioned for example in EP-A-441 282 and in patent applications cited therein. Other possibilities are saturated linear polyesters.

Preferred binders are ethylcellulose, ethylhydroxyethylcellulose, polyvinyl butyrate, polyvinyl acetate, cellulose propionate and saturated linear polyesters.

The weight ratio of a binder to dye mixture is in general within the range from 1:1 to 10:1.

Suitable assistants are for example release agents as mentioned in said EP-A-441 282 and patent applications cited therein. It is also possible to use in particular organic additives which prevent crystallization of the transfer dyes in the course of storage or on heating of the color ribbon, for example cholesterol or vanillin.

Suitable inert substrates are described for example in said EP and patent applications cited therein. The thickness of the substrate is in general from 3 to 30 μm, preferably from 5 to 10 μm.

The dye receptor layer can be basically any thermally stable plastic layer that possesses affinity for the dyes to be transferred, for example modified polycarbonates or polyesters. Further details may be found for example in said EP and patent applications cited therein.

The transfer is effected by means of an energy source, for example by means of a laser or by means of a thermal head that must be heatable to $\leq 300°$ C. in order for dye transfer to take place within the time range t: $0 > t > 15$ msec. In the course of transfer, the dye migrates out of the transfer sheet and diffuses into the surface coating of the receiving medium.

The dye mixtures of the invention are also advantageous for dyeing synthetic materials, for example polyesters, polyamides or polycarbonates. Of particular suitability are textile fabrics made of polyester or polyamide or polyester-cotton blend fabrics.

The novel dye mixtures are also advantageous for preparing color filters as described for example in EP-A-399 473.

Finally, they can also be used with advantage as colorants for preparing toners for electrophotography.

Embodiments of the invention will now be more particularly described by way of example.

EXAMPLES

Table 1 below lists the individual dyes used as mixture components.

TABLE 1

| Dye No. | Structure |
| --- | --- |
| 1 | (structure shown) |
| 2 | (structure shown) |
| 3 | (structure shown) |
| 4 | (structure shown) |
| 5 | (structure shown) |

TABLE 1-continued
| Dye No. | Structure |
|---|---|
| 6 | 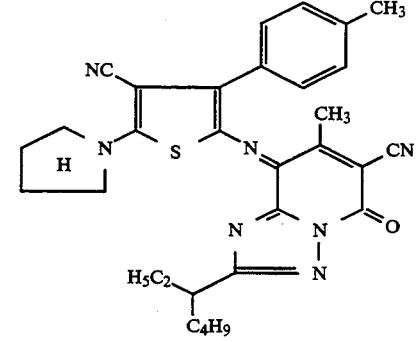 |
| 7 | 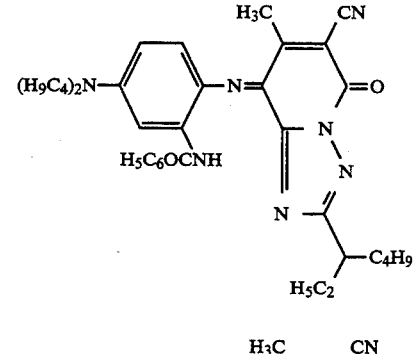 |
| 8 | 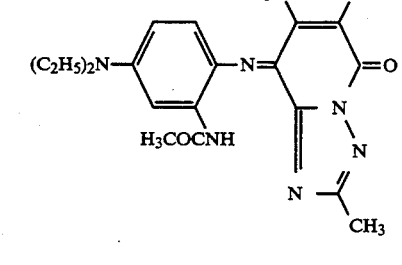 |
| 9 | 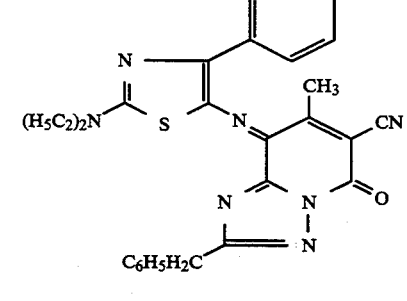 |
| 10 | 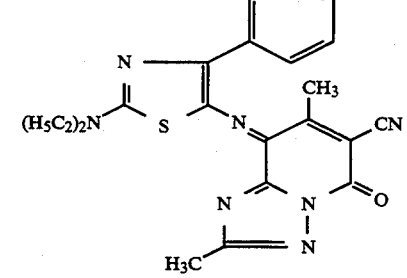 |

TABLE 1-continued

| Dye No. | Structure |
|---|---|
| 11 | |
| 12 | |
| 13 | |
| 14 | |
| 15 | |

TABLE 1-continued

| Dye No. | Structure |
|---|---|
| 16 | (structure image) |
| 17 | (structure image) |
| 18 | (structure image) |
| 19 | (structure image) |
| 20 | (structure image) |
| 21 | (structure image) |

TABLE 1-continued

| Dye No. | Structure |
|---|---|
| 22 | 1-amino-4-(3-methylphenylamino)anthraquinone-2-carboxylic acid n-octyl ester |
| 23 | 1-(methylamino)-4-(3-methylphenylamino)anthraquinone-2-carboxylic acid isopropyl ester |
| 24 | (azo/pyridone dye with $H_5C_2$, $H_9C_4NHCOOH_4C_2$ substituents on aniline ring, linked to pyridone bearing $CH_3$, CN, =O and hydrazono-$CH(C_2H_5)C_4H_9$) |
| 25 | (thiophene-2-carboxamido pyridone azo dye with 4-$N(C_2H_5)_2$, 2-$NHCOCH_3$ aniline) |
| 26 | (azo/pyridone dye with $H_5C_2O_2COH_4C_2$, $H_5C_2$ amino substituents, 2-$CH_3$ aniline linked to pyridone bearing $CH_3$, CN, =O and hydrazono-$CH(C_2H_5)C_4H_9$) |

TABLE 1-continued

| Dye No. | Structure |
|---|---|
| 27 | 1,4-diamino-anthraquinone-2-C(=N-N=)O-S-CH2-C6H4-C4H9 |
| 28 | 1,4-diamino-3-cyano-anthraquinone-2-CO2C2H4OC4H9 |
| 29 | 1,4-diamino-3-cyano-anthraquinone-2-(CO2(C2H4O)3C4H9) |
| 30 | 1,4-diamino-3-cyano-anthraquinone-2-CO2C2H4OC2H4OC2H5 |
| 31 | 1-amino-2-COCH3-4-(3-methylphenylamino)anthraquinone |
| 32 | complex azo dye with (C2H5)2N-phenyl, ClCHOCNH-CH3, H3C, CN, O, N=N, C4H9, H5C2 substituents |

TABLE 1-continued

| Dye No. | Structure |
|---|---|
| 33 | (structure) |
| 34 | (structure) |
| 35 | (structure) |
| 36 | (structure) |
| 37 | (structure) |

Table 2 below lists the light fastness (LF) of the individual dyes 1 to 31 and their thermal stability (TS). The value reported here and hereinafter as a measure of the light fastness is the number of hours of irradiation after which 20% of the dye quantity originally present had been destroyed.

The thermal stability is determined by storing the prints in a drying cabinet at 70° C. for 1 week. It is assessed on a scale from 1 to 6, where 1 denotes very good and 6 inadequate.

TABLE 2

| Dye No. | LF | TS |
|---|---|---|
| 1 | 86 | 1 |
| 2 | 46 | 3 |
| 3 | a) | a) |
| 4 | a) | a) |
| 5 | 61 | 2+ |
| 6 | 6 | 2 |
| 7 | a) | a) |
| 8 | a) | a) |
| 9 | <20 | 3 |

TABLE 2-continued

| Dye No. | LF | TS |
| --- | --- | --- |
| 10 | a) | a) |
| 11 | 16 | 2+ |
| 12 | a) | a) |
| 13 | 40 | 3 |
| 14 | a) | a) |
| 15 | a) | a) |
| 16 | 90 | 3 |
| 17 | 29 | 2 |
| 18 | a) | a) |
| 19 | 14 | 1 |
| 20 | 85 | 3+ |
| 21 | 24 | 1 |
| 22 | 168 | 1 |
| 23 | 96 | 1 |
| 24 | 31 | 3 |
| 25 | 37 | 2 |
| 26 | 70 | |
| 27 | 80 | 1 |
| 28 | 238 | 2 |
| 29 | 285 | 1 |
| 30 | 190 | 1 |
| 31 | 215 | 1 |
| 32 | 20 | 3 |
| 33 | 81 | 3 |
| 34 | 27 | 1 |
| 35 | 104 | 1 |
| 36 | 86 | 1 |
| 37 | 7 | 1 | a) No values were ascertainable, since the dye was either completely insoluble or only very sparingly soluble and thus crystallized out in the color ribbon.

a) No values were ascertainable, since the dye was either completely insoluble or only very sparingly soluble and thus crystallized out in the color ribbon.

General method:
a) 10 g of dye mixture are stirred with or without brief heating to 80°–90° C. into 100 g of a 10% strength by weight solution of a binder (Vylon® 290 from Toyobo) in 4.5:2:2 v/v/v methyl ethyl ketone/ toluene/cyclohexanone.

The printing ink is applied with a 6 μm doctor to a polyester film 6 μm in thickness whose back has been coated with a suitable lubricating layer and is blown dry with a hair dryer in the course of 1 minute. Before the color ribbon is used for printing, it subsequently has to air dry for at least 24 hours, since residual solvent can impair the printing process.

b) The color ribbons are printed in a computer controlled experimental setup equipped with a commercial thermal printing head onto Hitachi VY-S Video Print Paper.

The energy emitted by the thermal printing head is controlled by varying voltage with a pulse duration setting of 7 ms and only one pulse being emitted. The emitted energy is within the range from 0.7 to 2.0 mJ/dot.

Since the degree of coloration is directly proportional to the energy supplied, it is possible to produce a color wedge and analyse it spectroscopically.

The plot of the depth of shade versus the energy supplied per heating element is used to determine the Q* value (=energy in mJ for the absorbance value 1) and the slope m in 1/mJ.

The results obtained are listed below in Table 3, which additionally shows the mixing ratio (MR—weight ratio), the light fastness and the thermal stability.

TABLE 3

| Mixture of dyes | MR | LF | TS | Q* | m* |
| --- | --- | --- | --- | --- | --- |
| 1/2 | 3:1 | 179 | 1 | 1.27 | 1.54 |
| 1/3 | 3:1 | 162 | 2+ | 1.15 | 2.07 |
| 1/4 | 3:1 | 162 | 1 | 1.35 | 1.41 |
| 1/5 | 4:1 | 115 | 1 | 1.17 | 1.71 |
| 1/6 | 3:1 | 132 | 1 | 1.41 | 1.36 |
| 1/7 | 2:1 | 129 | 1 | 1.29 | 1.48 |
| 1/8 | 4:1 | 124 | 1 | 1.26 | 1.56 |
| 1/9 | 2:1 | 120 | 1 | 1.41 | 1.32 |
| 1/10 | 2:1 | 111 | 1 | 1.30 | 1.56 |
| 1/11 | 2.5:1 | 105 | 1 | 1.22 | 1.71 |
| 1/12 | 3:1 | 90 | 1 | 1.42 | 1.40 |
| 1/13 | 3.5:1 | 86 | 2+ | 1.25 | 1.57 |
| 1/14 | 1:1 | 84 | 1 | 1.49 | 1.16 |
| 1/15 | 2.5:1 | 82 | 1 | 1.38 | 1.33 |
| 1/16 | 4:1 | 89 | 2 | 1.17 | 1.60 |
| 1/17 | 4:1 | 77 | 1 | 1.11 | 1.82 |
| 1/18 | 2:1 | 66 | 1 | 1.41 | 1.25 |
| 1/19 | 2:1 | 60 | 1 | 1.43 | 1.38 |
| 1/20 | 4:1 | 60 | 1 | 1.48 | 1.29 |
| 1/33 | 1:1 | 130 | 1 | 1.16 | 1.79 |
| 1/37 | 1:1 | 115 | 1 | 0.96 | 2.83 |
| 21/6 | 5:1 | 41 | 1 | 1.04 | 2.03 |
| 22/11 | 5:1 | 188 | 1 | 1.11 | 2.22 |
| 23/11 | 4:1 | 155 | 1 | 1.15 | 1.57 |
| 23/7 | 4:1 | 115 | | 1.19 | 1.50 |
| 23/10 | 3.1 | 108 | 1 | 1.33 | 1.27 |
| 23/26 | 3:1 | 95 | | 1.17 | 1.52 |
| 23/37 | 1:1 | 76 | 1 | 0.93 | 2.54 |
| 23/24 | 1:1 | 81 | | 1.09 | 1.89 |
| 23/17 | 2:1 | 71 | | 1.18 | 1.44 |
| 23/6 | 5:1 | 62 | | 1.12 | 1.65 |
| 23/25 | 6:1 | 58 | | 1.10 | 1.75 |
| 27/11 | 4:1 | 47 | 1 | 1.54 | 1.10 |
| 27/20 | 5:1 | 47 | 2 | 1.46 | 1.20 |
| 28/20 | 4:1 | 156 | 2 | 1.20 | 1.57 |
| 28/11 | 5:1 | 151 | 1 | 1.11 | 1.93 |
| 28/24 | 1.5:1 | 111 | 3+ | 1.26 | 1.41 |
| 28/16 | 5.5:1 | 110 | 3+ | 1.09 | 1.87 |
| 29/11 | 4:1 | 62 | 1 | 1.18 | 1.48 |
| 29/16 | 4:1 | 59 | 3 | 1.00 | 1.85 |
| 30/7 | 6:1 | 187 | 2 | 1.23 | 1.53 |
| 30/11 | 1.5:1 | 80 | 1 | 1.05 | 1.98 |
| 30/17 | 2:1 | 52 | | | |
| 31/7 | 3:1 | 191 | 1 | 1.17 | 1.59 |
| 31/11 | 4:1 | 191 | 1 | 1.09 | 1.81 |
| 31/16 | 3:1 | 129 | | 1.15 | 1.67 |
| 31/6 | 5:1 | 92 | 1 | 1.17 | 1.57 |
| 31/26 | 2:1 | 88 | | 1.12 | 1.66 |
| 31/25 | 6:1 | 66 | | 1.13 | 1.74 |
| 31/24 | 1:1 | 64 | | 1.14 | 1.64 |
| 31/10 | 3:1 | 64 | | 1.43 | 1.08 |
| 31/17 | 2:1 | 57 | | 1.06 | 1.96 |
| 34/33 | 1:1 | 80 | 2 | 1.08 | 1.66 |
| 35/7 | 1:1 | 130 | | 1.17 | 1.85 |
| 35/11 | 1:1 | 74 | 1 | 1.15 | 1.86 |
| 35/32 | 1:1 | 101 | 2 | 1.74 | 0.87 |

On the assumption that under the action of light the dyes decay independently of one another and exponentially with time the following LF values were calculated for mixtures ½, 1/6 and 1/13:58, 12.5 and 55.

We claim:
1. Dye mixture comprising at least one anthraquinone dye whose absorption maximum is at a wavelength of from 600 to 750 nm and also at least one dye of the formula I, II, III, IV and/or V

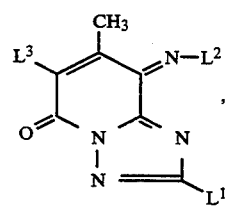

(I)

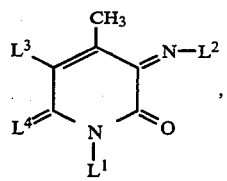

(II)

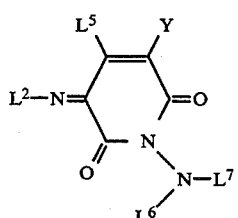

(III)

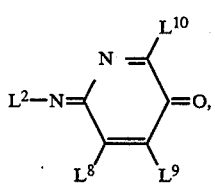

(IV)

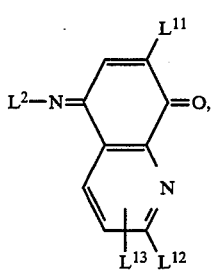

(V)

where

L¹ is $C_1-C_{20}$-alkyl, which may be substituted and may be interrupted by from 1 to 4 oxygen atoms in ether function, substituted or unsubstituted phenyl or hydroxyl, L² is a 5- or 6-membered carbocyclic or heterocyclic radical, L³ is cyano, carbamoyl, carboxyl or $C_1-C_4$-alkoxycarbonyl, L⁴ is oxygen or a radical of the formula

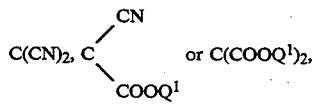

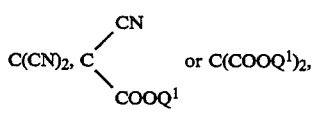

where Q¹ is in each case $C_1-C_8$-alkyl, which may be interrupted by 1 or 2 oxygen atoms in ether function, L⁵ is hydrogen or $C_1-C_4$-alkyl, L⁶ and L⁷ are identical or different and each is independently of the other hydrogen, substituted or unsubstituted $C_1-C_{12}$-alkyl, $C_5-C_7$-cycloalkyl, substituted or unsubstituted phenyl, substituted or unsubstituted 0pyridyl, substituted or unsubstituted $C_1-C_{12}$-alkanoyl, $C_1-C_{12}$-alkoxycarbonyl, substituted or unsubstituted $C_1-C_{12}$-alkylsulfonyl, $C_5-C_7$-cycloalkylsulfonyl, substituted or unsubstituted phenylsulfonyl, substituted or unsubstituted pyridylsulfonyl, substituted or unsubstituted benzoyl, pyridylcarbonyl or thienylcarbonyl, or together with the nitrogen atom joining them together are unsubstituted or $C_1-C_4$-alkyl-substituted succinimido, unsubstituted or $C_1-C_4$-alkyl-substituted phthalimido or a five- or six-membered saturated heterocyclic radical, which may contain further hetero atoms, is cyano or a radical of the formula $CO-Q^2$, $CO-OQ^2$ or $CO-NHQ^2$, where Q₂ is hydrogen, $C_1-C_8$-alkyl, which may be substituted and may be interrupted by 1 or 2 oxygen atoms in ether function, $C_5-C_7$-cycloalkyl, phenyl or tolyl, L⁸ is hydrogen, fluorine, chlorine, methyl or a radical of the formula —NH—CO—A¹, —NH—CO—OA¹, —NH—CO—NA¹A², —NH—CS—OA¹, —NH—CS—NA¹A², —NH—CO—A³—NH—SO₂—A¹, —NH—SO₂A³ or —NH—SO₂—NA¹A², where A¹ and A² are identical or different and each is independently of the other $C_1-C_8$-alkyl, which may be substituted and may be interrupted by 1 or 2 oxygen atoms in ether function, $C_5-C_7$-cycloalkyl, phenyl or tolyl, or else —NA¹SA² is amino, and A³ is a five- or six-membered aromatic heterocyclic radical, which may be benzofused and contain one or more hetero atoms selected from the group consisting of nitrogen, oxygen and sulfur, L⁹ is hydrogen, fluorine or chlorine, or L⁸ and L⁹ together with the carbon atoms to which they are attached are a five- or six-membered aromatic carbocyclic or heterocyclic ring, L¹⁰ is the abovementioned radical A³ or a radical of the formula —CO—OA¹, —CO—NH—A¹, —CO—NH—CO—A¹, —CO—NH—CO—A³, —CO—NH—SO₂—A³, —NH—CO—A¹, —NH—CO—OA¹, —NH—CO—NA¹A², —NH—CS—OA¹, —NH—CS—NA¹A², —NH—CO—A³, —NH—SO₂—A¹, —NH—SO₂—A³ or —NH—SO₂—NA¹A², where A¹, A² and A³ are each as defined above, L¹¹ is fluorine, chlorine or bromine, L¹² is hydrogen or $C_1-C_4$-alkyl, and L¹³ is hydrogen, fluorine, chlorine or bromine.

2. Dye mixtures as claimed in claim 1 comprising at least one anthraquinone dye of the formula VI, VII and/or VIII

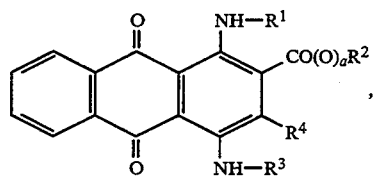

(VI)

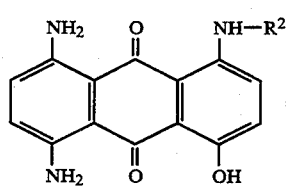

(VII)

-continued

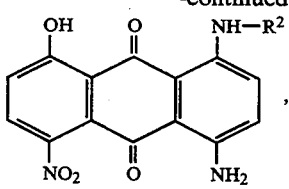
(VIII)

where
a is 0 or 1,
R$^1$, R$^2$ and R$^3$ are identical or different and each is independently of the others hydrogen, alkyl, alkoxyalkyl, alkanoyloxyalkyl, alkoxycarbonyloxyalkyl or alkoxycarbonylalkyl, each of which may have up to 20 carbon atoms and be phenyl-, C$_1$-C$_4$-alkylphenyl-, C$_1$-C$_4$-alkoxyphenyl-, halophenyl-, benzyloxy-, C$_1$-C$_4$-alkylbenzyloxy-, C$_1$-C$_4$-alkoxybenzyloxy-, halobenzyloxy-, halogen-, hydroxyl- or cyano-substituted, unsubstituted or C$_1$-C$_{15}$-alkyl-, C$_1$-C$_{15}$-alkoxy-, halogen- or benzyloxy-substituted phenyl, unsubstituted or C$_1$-C$_{15}$-alkyl-, C$_1$-C$_{15}$-alkoxy-, halogen- or benzyloxy-substituted cyclohexyl or a radical of the formula

[—E—O]m—R$^5$, where
E is C$_2$-C$_6$-alkylene,
R$^5$ is 1, 2, 3, 4, 5 or 6, and
is C$_1$-C$_4$-alkyl or unsubstituted or C$_1$-C$_4$-alkyl or C$_1$-C$_4$-alkoxy-substituted phenyl, and
R$^4$ is hydrogen or cyano,
with the proviso that R$^2$ is hydrogen only when a is 0.
3. Dye mixtures as claimed in claim 1 comprising from 10 to 90% by weight, based on the weight of the dye mixture, of one or more anthraquinone dyes and also from 10% to 90% by weight, based on the weight of the dye mixture, of one or more dyes of the formula I, II, III, IV and/or V.

* * * * *